United States Patent
Nagaya et al.

(10) Patent No.: US 11,858,327 B2
(45) Date of Patent: Jan. 2, 2024

(54) VEHICLE DRIVE DEVICE

(71) Applicant: AISIN CORPORATION, Aichi (JP)

(72) Inventors: Masahiro Nagaya, Kariya (JP);
Nozomu Takahashi, Kariya (JP);
Ryohei Inoue, Kariya (JP); Takeshi Torii, Kariya (JP); Daisuke Yamaoka, Kariya (JP); Taketoki Maruyama, Kariya (JP); Toshiya Sugiyama, Kariya (JP); Munehiro Takahashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/637,194

(22) PCT Filed: Feb. 24, 2021

(86) PCT No.: PCT/JP2021/006788
§ 371 (c)(1),
(2) Date: Feb. 22, 2022

(87) PCT Pub. No.: WO2021/172328
PCT Pub. Date: Sep. 2, 2021

(65) Prior Publication Data
US 2022/0281301 A1    Sep. 8, 2022

(30) Foreign Application Priority Data

Feb. 28, 2020   (JP) ................................. 2020-033937

(51) Int. Cl.
*F16H 57/02*    (2012.01)
*B60K 1/00*    (2006.01)
(Continued)

(52) U.S. Cl.
CPC .............. *B60K 1/00* (2013.01); *B60K 17/165* (2013.01); *B60L 15/20* (2013.01); *F16H 57/037* (2013.01);
(Continued)

(58) Field of Classification Search
CPC .. B60K 1/00; B60K 17/165; B60K 2001/001; B60L 15/20; B60L 15/007; F16H 57/037;
(Continued)

(56) References Cited

U.S. PATENT DOCUMENTS 10,381,902 B2 *   8/2019   Fukushima ............ H02K 7/006
2018/0304835 A1 *   10/2018   Skalski .................. H02K 5/225

FOREIGN PATENT DOCUMENTS

JP    2007-118808 A    5/2007
JP    2012-060785 A    3/2012
(Continued)

OTHER PUBLICATIONS

May 11, 2021 International Search Report issued in International Patent Application No. PCT/JP2021/006788.

*Primary Examiner* — Justin Holmes
(74) *Attorney, Agent, or Firm* — Oliff PLC

(57) ABSTRACT

A vehicle drive device includes a rotary electric machine disposed on a first axis, an output member disposed on a second axis parallel to the first axis, an inverter device, a terminal block for electrically connecting a rotary electric machine-side bus bar and an inverter-side bus bar, and a case. The case includes a first housing chamber for housing the rotary electric machine MG, a second housing chamber for housing the inverter device, and a partition wall for separating the first housing chamber and the second housing chamber. A terminal block is disposed such that an arrangement area of the terminal block in an axial direction overlaps the rotary electric machine, and disposed so as to penetrate the partition wall in a radial direction of the output member.

9 Claims, 12 Drawing Sheets

(51) Int. Cl.
*B60K 17/16* (2006.01)
*B60L 15/20* (2006.01)
*F16H 57/037* (2012.01)
*H02K 7/116* (2006.01)

(52) U.S. Cl.
CPC ........ *H02K 7/116* (2013.01); *B60K 2001/001* (2013.01); *B60Y 2400/61* (2013.01); *F16H 2057/02034* (2013.01); *F16H 2057/02052* (2013.01)

(58) Field of Classification Search
CPC ............ F16H 2057/02034; F16H 2057/02052; H02K 7/116; H02K 5/06; H02K 2203/09; H02K 5/225; H02K 7/006; H02K 11/33; B60Y 2400/61; H02M 7/003; H02M 7/48
See application file for complete search history.

(56) References Cited

FOREIGN PATENT DOCUMENTS

| | | | | | |
|---|---|---|---|---|---|
| JP | 2015182505 | A | * | 10/2015 | |
| JP | 2016-116294 | A | | 6/2016 | |
| WO | WO-2007049799 | A1 | * | 5/2007 | ............. B60K 11/04 |
| WO | WO-2014192376 | A1 | * | 12/2014 | ............. B60K 17/04 |
| WO | 2019/154685 | A1 | | 8/2019 | |

* cited by examiner

VEHICLE DRIVE DEVICE

TECHNICAL FIELD

The present disclosure relates to a vehicle drive device including a rotary electric machine and an inverter device for driving and controlling the rotary electric machine.

BACKGROUND ART

WO 2019/154685 discloses a vehicle drive device including a rotary electric machine, an output member that is drivingly connected to wheels, and an inverter device. The axis of the rotary electric machine and the axis of the output member are disposed on separate axes parallel to each other, and the inverter device is disposed to face the output member in a direction intersecting a line connecting the axis of the rotary electric machine and the axis of the output member. A connecting member for electrically connecting the inverter device and the rotary electric machine is disposed through the outer side (so-called the side) with respect to the axial end portions of the output member and the rotary electric machine.

RELATED ART DOCUMENTS

Patent Documents

Patent Document 1: WO 2019/154685

SUMMARY OF THE DISCLOSURE

Problem to be Solved by the Disclosure

As described above, when the electrical connecting member is disposed on the side of the rotary electric machine, a size of the vehicle drive device in the axial direction is increased, which may suppress reduction in size of the vehicle drive device.

Therefore, it is desired to provide a vehicle drive device of which the size can be further reduced while appropriately making an electrical connection between the rotary electric machine and the inverter device.

Means for Solving the Problem

A vehicle drive device in view of the above includes a rotary electric machine disposed on a first axis, a transmission mechanism to which drive force from the rotary electric machine is transmitted, a differential gear mechanism disposed on a second axis that is a separate axis parallel to the first axis and distributes the drive force from the rotary electric machine via the transmission mechanism to a wheel, an output member that is disposed on the second axis and that drivingly connects the differential gear mechanism and the wheel, an inverter device for driving and controlling the rotary electric machine, a terminal block for electrically connecting a rotary electric machine-side bus bar connected to a stator coil of the rotary electric machine and an inverter-side bus bar connected to the inverter device, and a case integrally formed in the case with a first housing chamber for housing the rotary electric machine and a second housing chamber for housing the inverter device. The integrally formed case includes a partition wall for separating the first housing chamber and the second housing chamber, and the terminal block is disposed such that an arrangement area of the terminal block in an axial direction that is a direction along the first axis overlaps the rotary electric machine and disposed so as to penetrate the partition wall in a radial direction of the output member.

According to this configuration, the inverter-side bus bar and the rotary electric machine-side bus bar are electrically connected via the terminal block that penetrates the partition wall for separating the second housing chamber and the first housing chamber in the radial direction. A member for electrically connecting the inverter-side bus bar and the rotary electric machine-side bus bar is not provided so as to protrude in the axial direction, so that an increase in size of the case in the axial direction is suppressed, and an increase in size of the vehicle drive device is suppressed. That is, according to this configuration, it is possible to provide the vehicle drive device of which the size can be further reduced while appropriately performing electrical connection between the rotary electric machine and the inverter device.

Further features and advantages of the vehicle drive device will be clarified from the following description of the embodiments described with reference to the drawings.

MODES FOR CARRYING OUT THE DISCLOSURE

Figure 4:
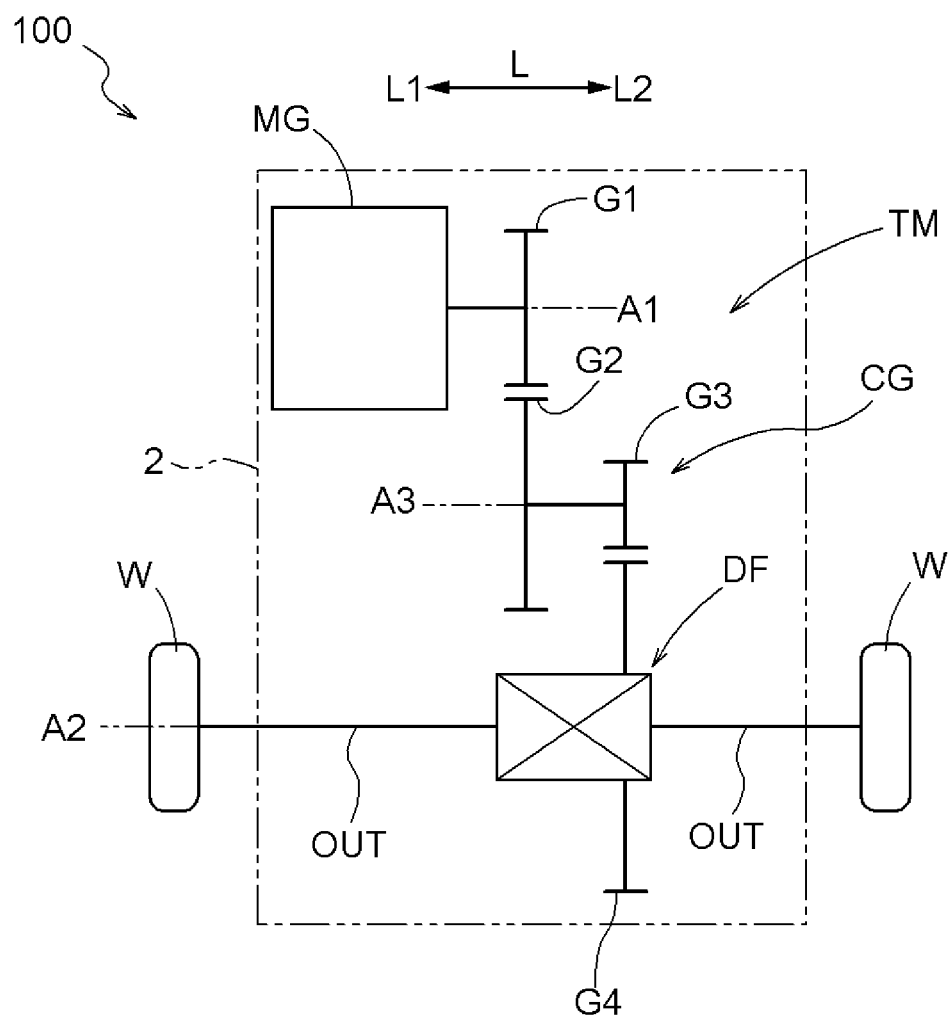
FIG. 4 is a skeleton diagram of the vehicle drive device.

Hereinafter, embodiments of the present disclosure will be described with reference to the drawings. Here, as shown in the skeleton diagram of FIG. 4, a form is shown as an example in which a vehicle drive device 100 includes a rotary electric machine MG that is a driving force source for a pair of wheels W, a counter gear mechanism CG, and a differential gear mechanism DF (differential gear device for output) that distributes drive force transmitted from the rotary electric machine MG to the wheels W via a pair of output members OUT. That is, in the present embodiment, a form is shown as an example in which the counter gear mechanism CG and the differential gear mechanism DF are provided as a transmission mechanism TM in order from the rotary electric machine MG side in a power transmission path for connecting the rotary electric machine MG serving as the driving force source and the output members OUT drivingly connected to the wheels W. However, the vehicle drive device 100 does not have to include the counter gear mechanism CG and the differential gear mechanism DF, and may include the rotary electric machine MG, the output members OUT drivingly connected to at least one of the wheels W, and the transmission mechanism TM (including a transmission member such as a belt or a chain) for transmitting the drive force between the rotary electric machine MG and the output members OUT. In the present embodiment, as shown in FIG. 4, the axis of the rotary electric machine MG (first axis A1) and the axis of the output member OUT (second axis A2) are separate axes parallel to each other. The axis of the differential gear mechanism DF is also the second axis A2 as in the output member OUT, and the axis of the counter gear mechanism CG is a third axis A3 that is a separate axis parallel to the first axis A1 and the second axis A2. The first axis A1, the second axis A2, and the third axis A3 are virtual axes that are different from each other and are disposed in parallel with each other.

In the following description, the direction parallel to the first axis A1, the second axis A2, and the third axis A3 will be referred to as an "axial direction L" of the vehicle drive device 100. One side of the axial direction L will be referred to as a first axial side L1 and the other side of the axial direction L will be referred to as a second axial side L2. In the example shown in FIG. 4, the transmission mechanism TM is disposed on the second axial side L2 with respect to the rotary electric machine MG. Further, the direction orthogonal to each of the first axis A1, the second axis A2, and the third axis A3 will be referred to as a "radial direction R" with respect to each axis. When it is not necessary to distinguish the axis to be used as a reference, or when the axis to be used as a reference is clear, the direction may be simply referred to as the "radial direction R". Further, the direction along the vertical direction when the vehicle drive device 100 is attached to the vehicle is defined as an "up-down direction V". Further, in the present embodiment, a first side V1 in the up-down direction, which is one side of the up-down direction V, is an upward direction, and a second side V2 in the up-down direction, which is the other side, is a downward direction. When the vehicle drive device 100 is attached to the vehicle in a state parallel to a horizontal plane, one direction of the radial direction R and the up-down direction V coincide with each other. Further, the direction orthogonal to the axial direction L and the up-down direction V is referred to as a "front-rear direction H". Further, one side of the front-rear direction H is referred to as a first side H1 in the front-rear direction, and the other side of the front-rear direction H is referred to as a second side H2 in the front-rear direction. Similar to the up-down direction V, one direction of the radial direction R and the front-rear direction H coincide with each other. In the following description, terms related to the direction, the position, and the like of each member represent concepts that include a state in which there is a difference due to an error that is allowed in manufacturing. In addition, the direction of each member represents a direction of the member that is assembled to the vehicle drive device 100.

Figure 1:
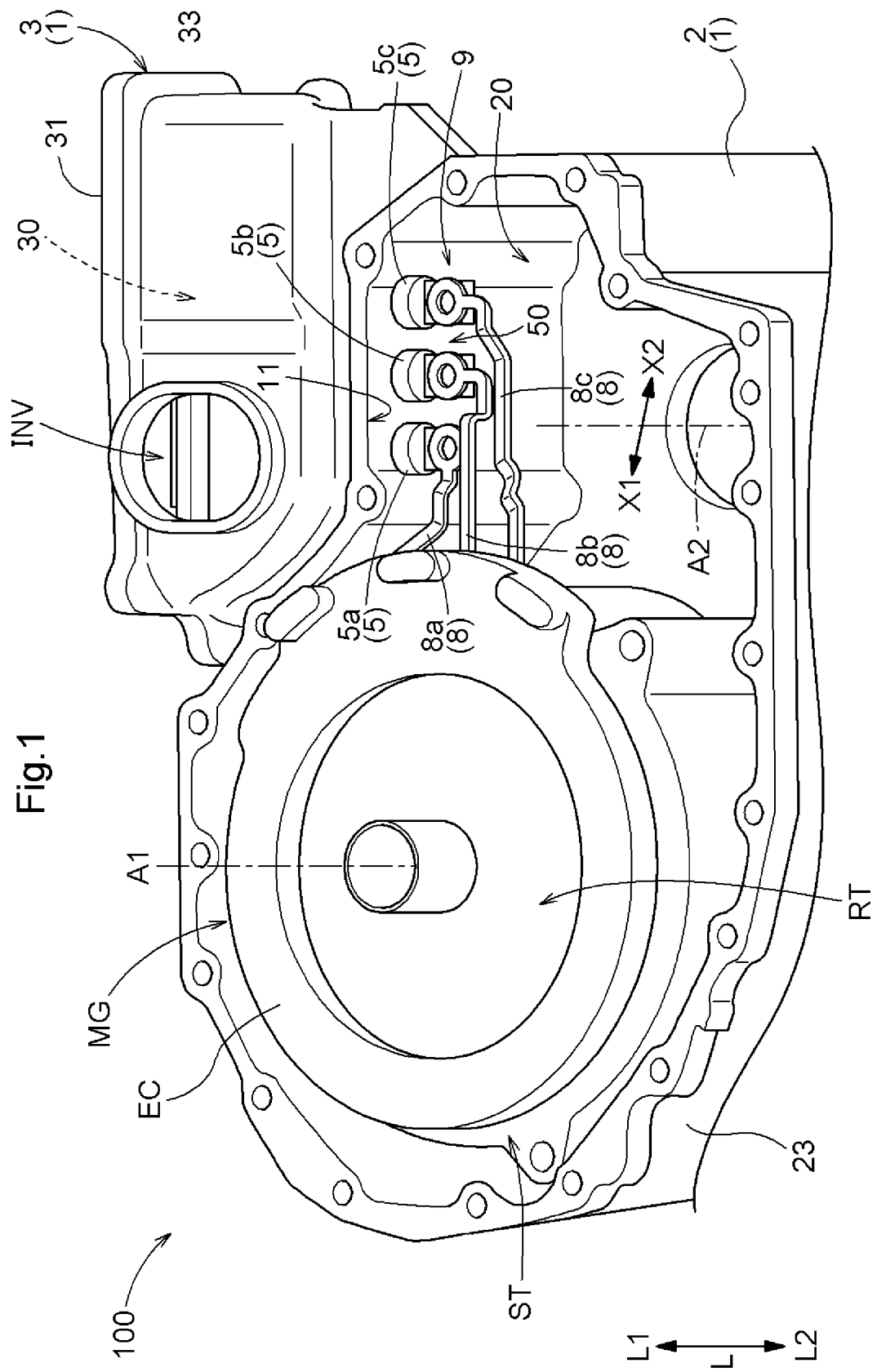
FIG. 1 is a perspective view showing an example of a vehicle drive device.

As shown in FIG. 1, the vehicle drive device 100 includes a case 1 in which the rotary electric machine MG, an inverter device INV for driving and controlling the rotary electric machine MG, the output members OUT, and the transmission mechanism TM are housed. The output members OUT may be provided outside the case 1. For example, the connecting member for connecting the differential gear mechanism DF and the output members OUT may be provided in the case 1, and the output members OUT may be provided outside the case 1. Further, since such a connecting member rotates together with the output members OUT, it can be considered that the connecting member constitutes a part of the output members OUT. For example, of members that rotate together with the output members OUT (the above connecting member, an output gear of the differential gear mechanism DF, etc.), a portion that is housed in the case 1 may be referred to as a target portion of the output member OUT, in addition to the output members OUT.

The case 1 is provided with a first housing chamber 20 for housing a drive mechanism including the rotary electric machine MG, the output members OUT, and the transmission mechanism TM, and a second housing chamber 30 for housing the inverter device INV. Hereinafter, the portion forming the first housing chamber 20 in the case 1 is referred to as a first housing portion 2, and the portion forming the second housing chamber 30 in the case 1 is referred to as a second housing portion 3. In the present embodiment, the case 1 provided with the first housing portion 2 and the second housing portion 3 is composed of one member. Such a case 1 is preferably a cast body in which the first housing portion 2 including a peripheral wall portion 23 surrounding the first housing chamber 20 and a second housing portion 3 including a side wall portion 33 surrounding the second housing chamber 30 are integrally formed.

The first housing portion 2 is formed in a cylindrical shape that opens in the axial direction L. Although not shown in FIGS. 1 to 3, a first cover 10a is attached to the end of the case 1 (first housing chamber 20) on the first axial side L1 in FIG. 1, and a second cover 10b is attached to the end of the case 1 (first housing chamber 20) on the second axial side L2 (see, for example, FIG. 6). The first cover 10a is a cover member that closes an opening formed at the end of the first housing portion 2 in the case 1 on the first axial side L1. The second cover 10b is a cover member that closes an opening formed at the end of the first housing portion 2 in the case 1 on the second axial side L2. The openings formed at opposite ends of the first housing portion 2 in the axial direction L communicate with the first housing chamber 20. The first housing chamber 20 is formed as a space surrounded by the peripheral wall portion 23, the first cover 10a, the second cover 10b, and a partition wall 11 described below.

The second housing portion 3 is disposed adjacent to the first housing portion 2 in the radial direction. On one side of the second housing portion 3 adjacent to the first housing portion 2, the side wall portion 33 is provided so as to extend in the radial direction from the peripheral wall portion 23 of the first housing portion 2. On the opposite side to the one side of second housing portion 3 adjacent to the first housing portion 2, an opening is formed, and a third cover 31 is attached so as to close the opening. Further, on the one side of the second housing portion 3 adjacent to the first housing portion 2, the partition wall 11 described below is located. The second housing chamber 30 is formed as a space surrounded by the side wall portion 33, the third cover 31, and the partition wall 11.

In addition to these, an auxiliary case member separate from the case 1 may be attached to the case 1. Then, the auxiliary case member may form a housing chamber for housing components other than the rotary electric machine MG and the inverter device INV. As the components housed in such a housing chamber, for example, in addition to the transmission mechanism TM as described above, various components of the vehicle drive device 100 such as an oil pump and auxiliary equipment may be targeted.

As described above, the case 1 includes the first housing portion 2 forming the first housing chamber 20 and the second housing portion 3 forming the second housing chamber 30. Further, in the present embodiment, the case 1 is composed of one member. The second housing chamber 30 and the first housing chamber 20 are formed as independent spaces, and the case 1 includes the partition wall 11 for separating the second housing chamber 30 and the first housing chamber 20.

The rotary electric machine MG is a rotary electric machine (motor/generator) that operates by multiple phase alternating current (for example, three-phase alternating current), and can function as both an electric motor and a generator. As will be described below with reference to FIG. 5, the rotary electric machine MG receives electric power supplied from a high-voltage battery BH (high-voltage direct current power source) to perform power running, or supplies (regenerates) electric power generated by the inertial force of the vehicle to the high-voltage battery BH. The high-voltage battery BH is composed of, for example, a secondary battery (battery) such as a nickel hydrogen battery or a lithium ion battery, an electric double layer capacitor, or the like. When the rotary electric machine MG is the driving force source of the vehicle, the high-voltage battery BH is a direct current power source having a large voltage and a large capacity, and the rated power source voltage is, for example, 200 to 400 [V]. The low-voltage battery BL (low-voltage direct current power source) shown in FIG. 5 is a power source having a lower voltage (for example, 12 to 24 [V]) than the high-voltage battery BH.

As shown in FIG. 1, the rotary electric machine MG includes a stator ST fixed to the case 1 or the like, and a rotor RT rotatably supported on the inner radial side of the stator ST. The stator ST includes a stator core and a stator coil 81 wound around the stator core, and the rotor RT includes a rotor core and permanent magnets disposed on the rotor core. The rotor RT of the rotary electric machine MG is drivingly connected to an input gear G1 (see FIG. 4).

The input gear G1 is drivingly connected to the counter gear mechanism CG. In the present embodiment, the counter gear mechanism CG includes two gears (a counter driven gear G2 and a counter drive gear G3) connected by a shaft member. The counter driven gear G2 meshes with the input gear G1, and the counter drive gear G3 meshes with a differential input gear G4 of the differential gear mechanism DF. The differential gear mechanism DF is drivingly connected to the wheels W via the output members OUT. The differential gear mechanism DF is configured to include bevel gears that mesh with each other, and transmits rotation and torque input to the differential input gear G4 such that the rotation and the torque are distributed to two right and left output members OUT (that is, two right and left wheels W). As a result, the vehicle drive device 100 can transmit the torque of the rotary electric machine MG to the wheels W to cause the vehicle to travel.

Figure 2:
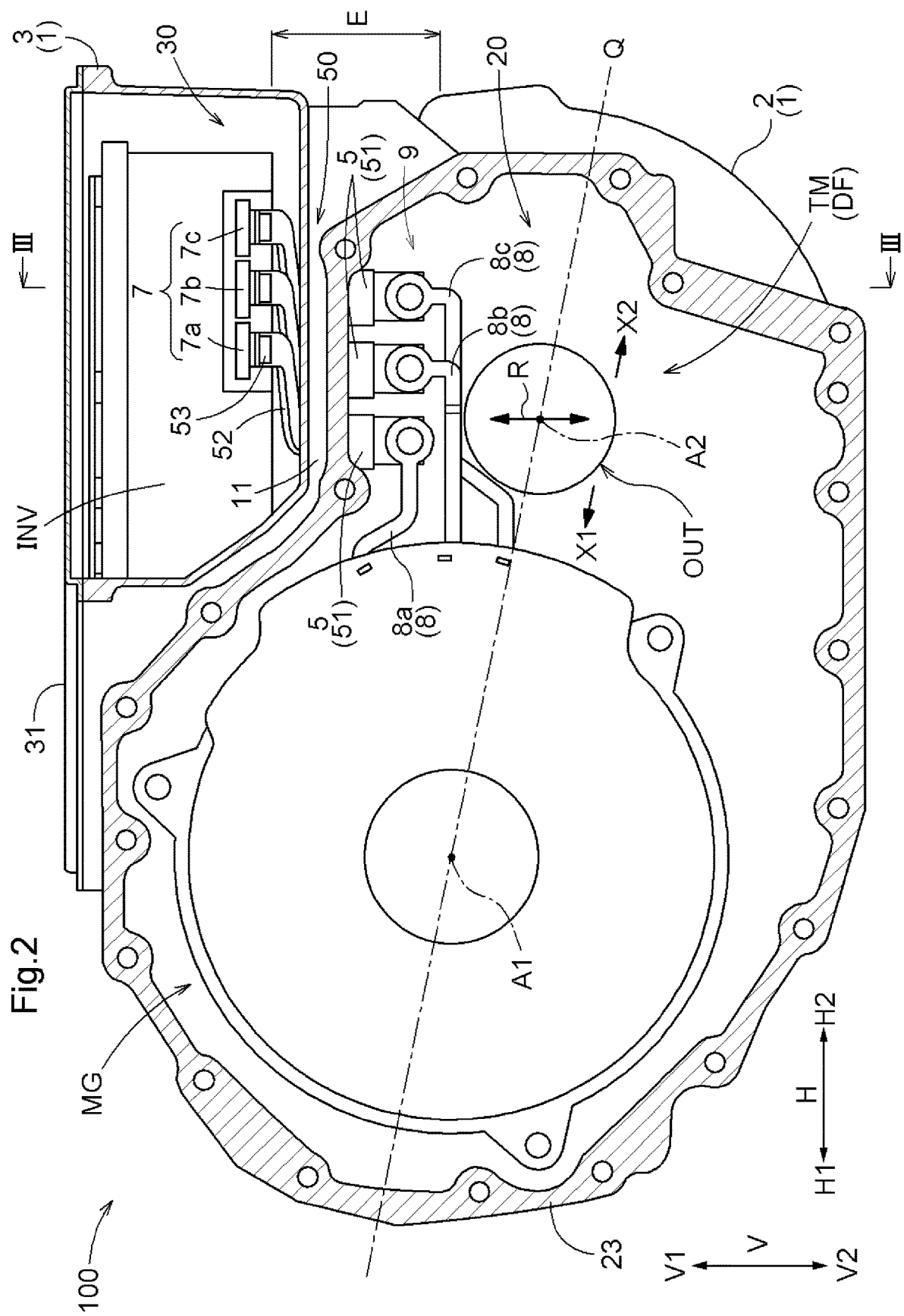
FIG. 2 is an axial plan view showing an example of the vehicle drive device.
Figure 3:
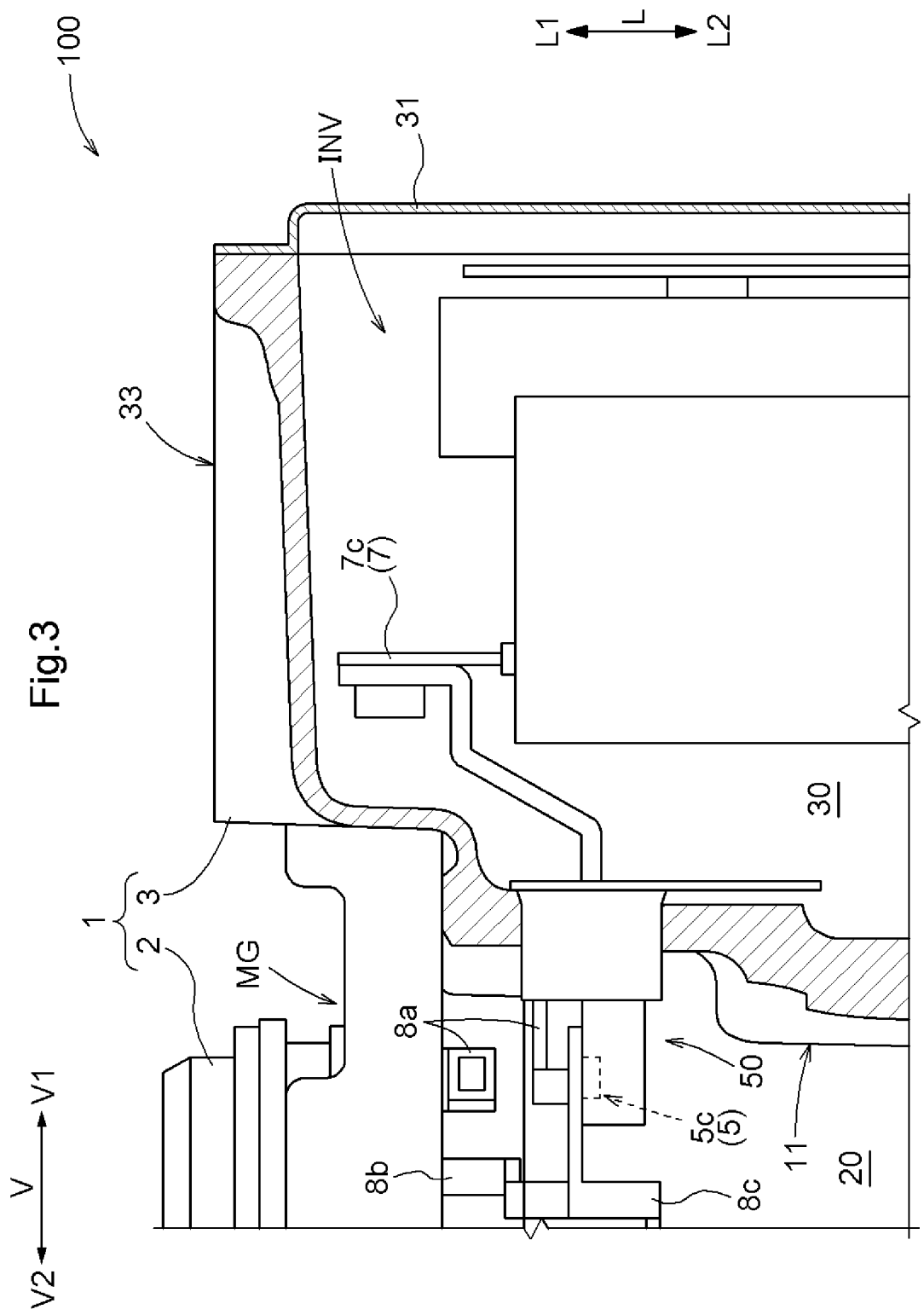
FIG. 3 is an enlarged cross-sectional view taken along line III-III in FIG. 2.
Figure 5:
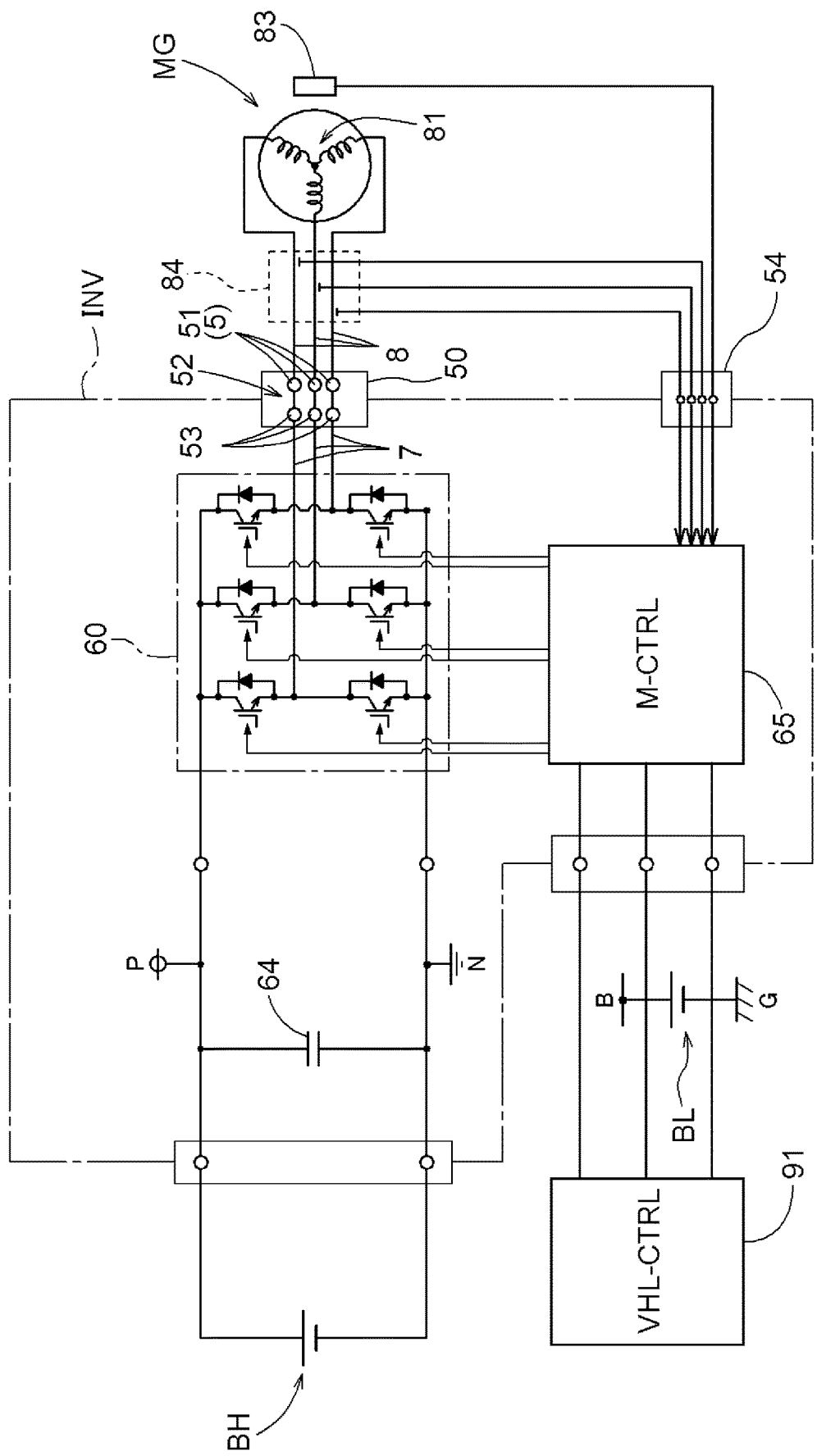
FIG. 5 is a schematic circuit block diagram of an electric system for driving a rotary electric machine.

As shown in FIG. 5, the rotary electric machine MG is driven and controlled by the inverter device INV. In the present embodiment, the inverter device INV is also housed in the second housing portion 3 in the case 1 (see FIGS. 1 to 3). The inverter device INV includes an inverter circuit 60 that converts electric power between direct current power and multiple phase alternating current power. In the present embodiment, the inverter circuit 60 connected to the alternating current rotary electric machine MG and the high-voltage battery BH to convert electric power between direct current and multiple phase alternating current (here, three phases of U phase, V phase, and W phase) is shown as an example. The inverter circuit 60 is configured to include a plurality of switching elements, is connected to the high-voltage battery BH, and is connected to the alternating current rotary electric machine MG to convert electric power between direct current and multiple phase alternating current (here, three-phase alternating current). Inverter-side bus bars 7 and rotary electric machine-side bus bars 8 are connected via a terminal block 50. As shown in FIGS. 1 to 3, the terminal block 50 is disposed so as to penetrate, in the radial direction R of the output member OUT, the partition wall 11 for separating the second housing chamber 30 and the first housing chamber 20 (see FIG. 2).

In the present embodiment, as shown in FIG. 2 and the like, the inverter-side bus bars 7 include three bus bars, which are a first inverter-side bus bar 7a, a second inverter-side bus bar 7b, and a third inverter-side bus bar 7c, corresponding to the three-phase alternating current. Similarly, the rotary electric machine-side bus bars 8 also include three bus bars, which are a first rotary electric machine-side bus bar 8a, a second rotary electric machine-side bus bar 8b, and a third rotary electric machine-side bus bar 8c. In the second housing chamber 30, second housing chamber-side connecting portions 53 (see FIGS. 1, 5, etc.) to which the inverter-side bus bars 7 are connected are located on the terminal block 50, and in the first housing chamber 20, first housing chamber-side connecting portions 51 (see FIGS. 2, 5, etc.) to which the rotary electric machine-side bus bars 8 are connected are located on the terminal block 50. The second housing chamber-side connecting portions 53 and the first housing chamber-side connecting portions 51 are electrically connected by a terminal block bus bar 52 (see FIGS. 2 and 5). As a matter of course, the second housing chamber-side connecting portions 53 and the first housing chamber-side connecting portions 51 may be formed at opposite ends of the terminal block bus bar 52.

In the following description, when the term is simply referred to as a connection terminal portion 5, it refers to the first housing chamber-side connecting portion 51. Further, when each of the connection terminal portions 5 (first housing chamber-side connecting portions 51) is distinguished, a connection terminal portion 5 to which the first rotary electric machine-side bus bar 8a is connected is referred to as a first connection terminal portion 5a, a connection terminal portion 5 to which the second rotary electric machine-side bus bar 8b is connected is referred to as a second connection terminal portion 5b, and a connection terminal portion 5 to which the third rotary electric machine-side bus bar 8c is connected is referred to as a third connection terminal portion 5c.

The inverter circuit 60 includes a plurality of (here, three) arms for single phase alternating current configured by a series circuit of upper side switching elements and lower side switching elements. It is preferable that a power semiconductor element capable of operating at a high frequency, such as an insulated gate bipolar transistor (IGBT), a power metal oxide semiconductor field effect transistor (MOSFET), a silicon carbide-metal oxide semiconductor FET (SiC-MOSFET), a SiC-static induction transistor (SiC-SIT), and a gallium nitride-MOSFET (GaN-MOSFET) be applied to the switching elements. As shown in FIG. 5, in the present embodiment, a form is shown as an example in which the IGBT is used as the switching elements. In the present embodiment, a switching element module is configured such that the inverter circuit 60, which includes a fly-wheel diode as well, is integrated in one power module (semiconductor module)

The direct current side of the inverter circuit 60 includes a direct current link capacitor 64 (smoothing capacitor) for smoothing a direct current link voltage (voltage between a positive electrode power source line P and a negative electrode power source line N on the direct current side of the inverter circuit 60). The direct current link capacitor 64 stabilizes a direct current voltage (direct current link voltage) that fluctuates in accordance with the fluctuation of consumed electric power of the rotary electric machine MG.

As shown in FIG. 5, the inverter circuit 60 is controlled by an inverter control device 65 (M-CTRL). The inverter control device 65 is constructed with a logic circuit such as a microcomputer as a core member. The inverter control device 65 performs, based on a target torque of the rotary electric machine MG, current feedback control using a vector control method, and controls the rotary electric machine MG via the inverter circuit 60. The target torque of the rotary electric machine MG is, for example, provided as a request signal from other control devices such as a vehicle control device 91 (VCL-CTRL) that is one of the higher-order control devices in the vehicle. An actual current flowing through a stator coil 81 of each phase of the rotary electric machine MG is detected by a current sensor 84. Further, a magnetic pole position at each time point of the rotor RT of the rotary electric machine MG is, for example, detected by a rotation sensor 83 such as a resolver. A detection result of the current sensor 84 and the rotation sensor 83 is transmitted to the inverter device INV via a sensor connector 54.

The inverter control device 65 performs current feedback control using the detection result of the current sensor 84 and the rotation sensor 83. The inverter control device 65 is configured to include various functional units for current feedback control, and each of the functional units is realized by cooperation between hardware such as a microcomputer and software (program). Since the current feedback control is well-known, detailed description thereof will be omitted here.

The vehicle control device 91 and the inverter control device 65 configured with a microcomputer and the like having an operating voltage of 5 [V] or 3.3 [V] for example as a core is a low voltage circuit that is operated with electric power supplied from the low-voltage battery BL. Therefore, the inverter control device 65 is provided with a driving circuit in which a driving capacity (for example, capacity for operating a following circuit such as a voltage amplitude and output current) of a switching control signal (in the case of the IGBT, gate driving signal) for each switching element is enhanced and relayed. That is, a control terminal (for example, gate terminal of the IGBT) of each switching element constituting the inverter circuit 60 is connected to the microcomputer and the like that serves as a core for the inverter control device 65 via the driving circuit, and switching control is performed for each switching element. The inverter control device 65 is configured to include one or more wiring boards.

The inverter device INV is configured to include the inverter control device 65, the direct current link capacitor 64, and the inverter circuit 60 (power module) described above. As described above, in the present embodiment, the inverter circuit 60 is configured by the switching element module including the switching elements constituting the inverter circuit 60 and wiring for connecting the switching elements. Further, in FIG. 5, a form is shown as an example in which the current flowing through the rotary electric machine-side bus bars 8 for connecting the inverter device INV and the rotary electric machine MG is detected by the current sensor 84, and the current sensor 84 is disposed separately from the inverter device INV. However, a form may be adopted in which the current sensor 84 is disposed inside the inverter device INV to detect the current flowing through the inverter-side bus bars 7. Further, a form may be adopted in which the current sensor 84 is disposed on the terminal block 50 for connecting the inverter-side bus bars 7 and rotary electric machine-side bus bars 8 to detect the alternating current.

As described above, the terminal block 50 for electrically connecting the inverter-side bus bars 7 and the rotary electric machine-side bus bars 8 may be disposed so as to penetrate, in the radial direction R of the output member OUT, the partition wall 11 for separating the second housing chamber 30 and the first housing chamber 20. The member for electrically connecting the inverter-side bus bars 7 and the rotary electric machine-side bus bars 8 is not provided so as to protrude in the axial direction, so that an increase in size of the case 1 in the axial direction L is suppressed, and an increase in size of the vehicle drive device 100 is suppressed.

As shown in FIGS. 1 and 2, in the present embodiment, at least a part of the terminal block 50 and at least parts of the rotary electric machine-side bus bars 8 are disposed in a target area E sandwiched between the output member OUT and the inverter device INV. That is, the terminal block 50 and the rotary electric machine-side bus bars 8 can be disposed by effectively utilizing the area (target area E) sandwiched between the output member OUT and the inverter device INV, so that the size of the vehicle drive device 100 can be reduced.

Further, in the present embodiment, as shown in FIG. 2 and the like, at least parts of the connection terminal portions 5 to which the rotary electric machine-side bus bars 8 are connected in the terminal block 50 are located on a second direction X2 side that is a farther side from the rotary electric machine MG with the second axis A2 that is the axis of the output member OUT as a reference. Here, a plane including the first axis A1 that is the axis of the rotary electric machine MG and the second axis A2 that is the axis of the output member OUT (see FIG. 2) is referred to as a reference plane Q, and in a direction along the reference plane Q, a direction to the rotary electric machine MG side (closer side to the rotary electric machine MG) from the second axis A2 is referred to as a first direction X1 and a direction to an opposite side from the rotary electric machine MG (farther side from the rotary electric machine MG) is referred to as a second direction X2. In the present embodiment, at least parts of the connection terminal portions 5 to which the rotary electric machine-side bus bars 8 are connected in the terminal block 50, specifically the second connection terminal portion 5b and the third connection terminal portion 5c (see FIG. 1), are located on the second direction X2 side that is a farther side from the rotary electric machine MG with respect to the second axis A2. In the configuration according to the present embodiment, the distance between the first axis A1 and the second axis A2 is close, so that the terminal block 50 is disposed as described above. As described above, with the configuration according to the present embodiment, the output member OUT and the rotary electric machine MG can be disposed close to each other, so that the size of the vehicle drive device 100 in the radial direction (here, the direction generally along the reference plane Q) can be reduced.

Further, as described in the present embodiment, when the rotary electric machine MG is driven by the multiple phase alternating current, a plurality of the rotary electric machine-side bus bars 8 is also provided according to the multiple phase alternating current. In the present embodiment, as shown in FIG. 2, the second rotary electric machine-side bus bar 8*b* and the third rotary electric machine-side bus bar 8*c* that are parts of the rotary electric machine-side bus bars 8 overlap each other when viewed from the axial direction L. More specifically, a part of the second rotary electric machine-side bus bar 8*b* and a part of the third rotary electric machine-side bus bar 8*c* overlap each other when viewed from the axial direction L. Therefore, as compared with a case in which all the rotary electric machine-side bus bars 8 are disposed so as not to overlap each other when viewed from the axial direction L, the length between the output member OUT and the inverter device INV can be shortened, so that the size of the vehicle drive device 100 can be reduced. Further, as shown in FIG. 3, the second rotary electric machine-side bus bar 8*b* and the third rotary electric machine-side bus bar 8*c* overlapping each other when viewed from the axial direction L can be appropriately disposed apart from each other in the axial direction L, so that an insulating distance can also be secured.

Figure 6:
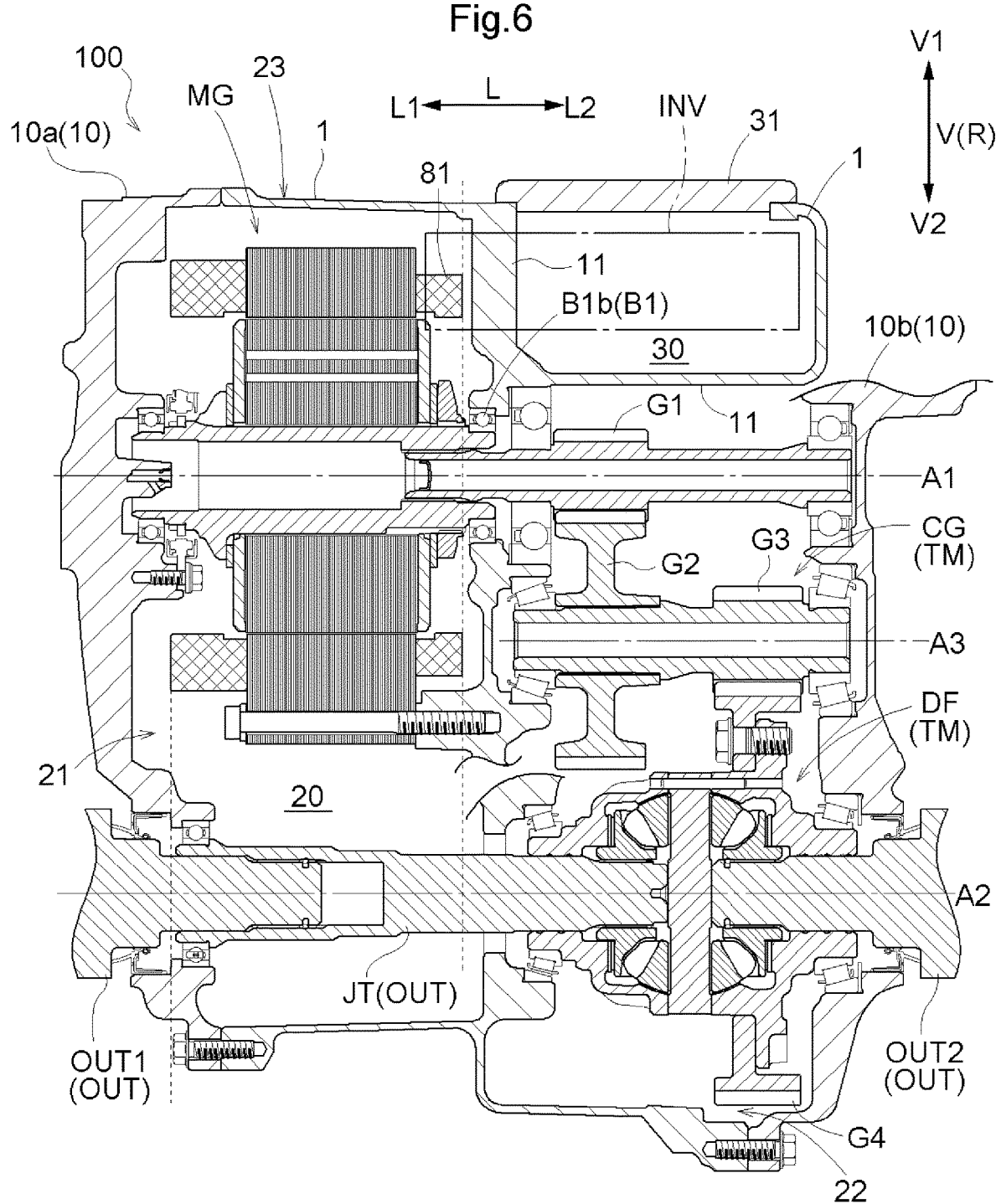
FIG. 6 is an axial sectional view of the vehicle drive device.

Hereinafter, a more specific structure will be shown as an example and described. In the following description as well, the same portions as described above are indicated by the same reference numerals. FIG. 6 is an axial sectional view of the vehicle drive device 100, FIG. 7 is an axial orthogonal sectional view of the vehicle drive device 100, and FIG. 8 is a plan view of the vehicle drive device 100 from a first side V1 in the up-down direction.

As described above with reference to FIG. 1 and the like, the vehicle drive device 100 includes the rotary electric machine MG disposed on the first axis A1, the transmission mechanism TM to which the drive force from the rotary electric machine MG is transmitted, the differential gear mechanism DF disposed on the second axis A2, the output member OUT disposed on the second axis A2, the inverter device INV, the terminal block 50, and the case 1. The case 1 is integrally formed therein with the first housing chamber 20 for housing the rotary electric machine MG and the second housing chamber 30 for housing the inverter device INV. The integrally formed case 1 includes the partition wall 11 for separating the first housing chamber 20 and the second housing chamber 30, and the terminal block 50 is disposed such that the arrangement area thereof in the axial direction L overlaps the rotary electric machine MG and disposed so as to penetrate the partition wall 11 in the radial direction R of the output member OUT (see FIG. 7).

As described above, when the case 1 is integrally formed therein with the first housing chamber 20 and the second housing chamber 30, the case 1 can have high rigidity as compared with a case in which the case 1 is configured by assembling the first housing chamber 20 and the second housing chamber 30 that are formed separately. Further, as compared with the case in which the two housing chambers are formed separately, the partition wall 11 for separating the first housing chamber 20 and the second housing chamber 30 can be commonized, so that the weight of the case 1 can be reduced. Further, in the present embodiment, since the rotary electric machine MG that is the driving force source of the wheels W and the output members OUT drivingly connected to the wheels W are housed in the first housing chamber 20, the first axis A1 and the second axis A2 can be easily disposed close to each other.

Figure 7:
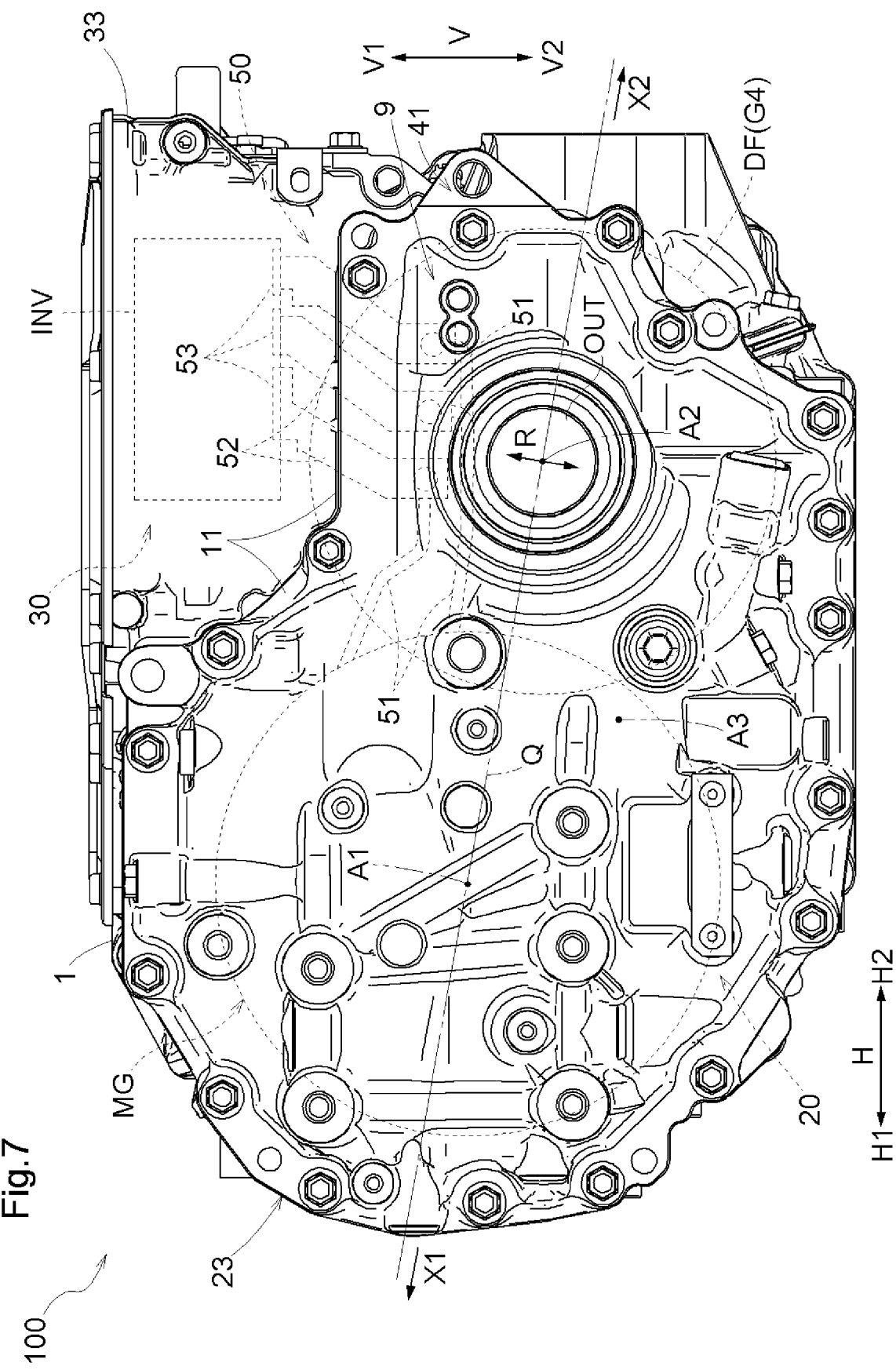
FIG. 7 is an axial orthogonal sectional view of the vehicle drive device.
Figure 8:
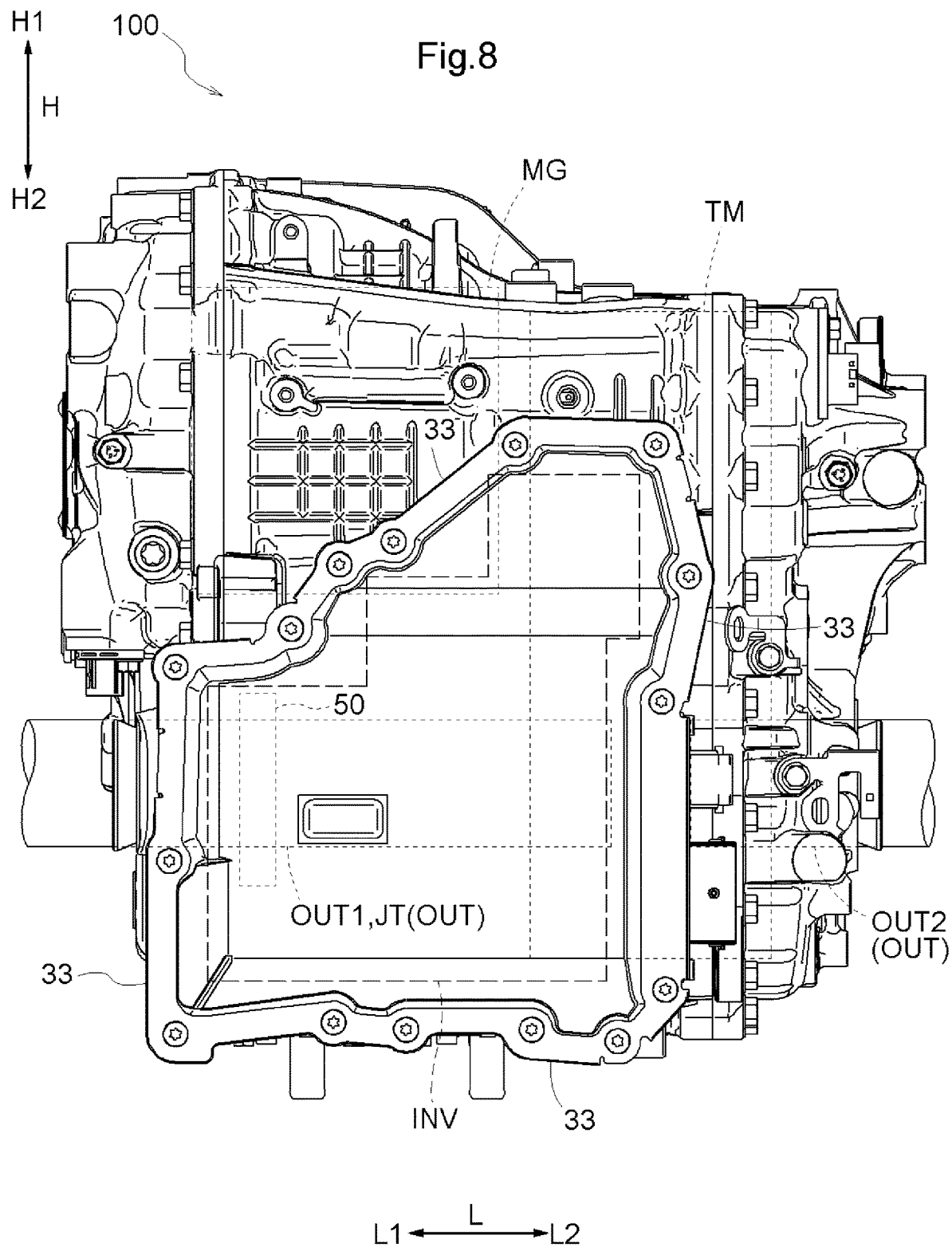
FIG. 8 is a plan view of the vehicle drive device from a first side in an up-down direction.

In the present embodiment, as shown in FIG. 7, the terminal block 50 and the bus bars (the inverter-side bus bars 7 and the rotary electric machine-side bus bars 8) for connecting the rotary electric machine MG and the inverter device INV are disposed between the partition wall 11 and the output member OUT. Since the rotary electric machine MG and the output member OUT are housed in the first housing chamber 20 formed in the integrally formed case 1, an empty space can be easily secured in the first housing chamber 20. The terminal block 50 and the bus bars are disposed in such an empty space, so that an increase in size of the vehicle drive device 100 can be suppressed while securing a space for wiring. Further, the first housing chamber 20 for housing the rotary electric machine MG and the second housing chamber 30 for housing the inverter device INV are separated by the partition wall 11. In other words, the first housing chamber 20 and the second housing chamber 30 are adjacent to each other via one common partition wall 11. Further, since the inverter device INV and the output member OUT (second axis A2) overlap when viewed from the up-down direction, the rotary electric machine MG and the inverter device INV can be electrically connected via the bus bars in a short distance in an appropriate manner by disposing the terminal block 50 and the bus bars between the partition wall 11 and the output member OUT (second axis A2).

As shown in FIG. 7, the terminal block 50 and the partition wall 11 for separating the first housing chamber 20 and the second housing chamber 30 are disposed between the inverter device INV and the output member OUT (second axis A2). The output member OUT housed in the first housing chamber 20 and the inverter device INV housed in the second housing chamber 30 overlap each other when viewed from the up-down direction. Therefore, it is possible to suppress an increase in dimensions of the case 1 integrally formed therein with the first housing chamber 20 and the second housing chamber 30 in the up-down direction V. Further, the terminal block 50 can be disposed by effectively utilizing the target area E sandwiched between the second axis A2 and the inverter device INV. In the present embodiment, the output member OUT is disposed in the first housing chamber 20, and the partition wall 11 and the terminal block 50 can be disposed by effectively utilizing the target area E sandwiched between the output member OUT and the inverter device INV.

Further, as shown in FIGS. 7 and 8, the terminal block 50 is disposed at a position where the arrangement area thereof in the front-rear direction H that is a direction orthogonal to both the axial direction L and the up-down direction V overlaps the second axis A2. Therefore, the terminal block 50 can be disposed by efficiently utilizing the housing space in the case 1, and an increase in size of the vehicle drive device 100 can be suppressed.

As described above, the transmission mechanism TM includes the differential gear mechanism DF for distributing the drive force transmitted from the rotary electric machine MG to the wheels W. The output members OUT transmit the drive force distributed from the differential gear mechanism DF to each of the wheels W. Here, the output member OUT disposed on the first axial side L1 is referred to as a first output member OUT1, and the output member OUT disposed on the second axial side L2 is referred to as a second output member OUT2 (see FIG. 6). Further, the first output member OUT1 is connected to the differential gear mechanism DF via a connecting shaft JT. The connecting shaft JT is also included in the output members OUT. That is, the output members OUT include the first output member OUT1, the second output member OUT2, and the connecting shaft JT. As shown in FIG. 6, the output members OUT extend to the outside of the case 1. Of the output members OUT, at least a portion overlapping the rotary electric machine MG in the axial direction L (here, parts of the first output member OUT1 and the connecting shaft JT) is housed in the first housing chamber 20. In the form shown as an example in FIG. 6, a part of the second output member OUT2 is also housed in the first housing chamber 20.

The vehicle drive device 100 includes a main body cover 10 (a first cover 10a and a second cover 10b) that closes the first housing chamber 20, and a third cover 31 that closes the second housing chamber 30. The case 1 including the rotary electric machine MG, the transmission mechanism TM, and the inverter device INV is formed by the first cover 10a that closes an opening (first opening 21) of the first housing portion 2 of the case 1 on the first axial side L1, the second cover 10b that closes an opening (second opening 22) of the first housing portion 2 of the case 1 on the second axial side L2, and the third cover 31 that closes the second housing portion 3 of the case 1.

Since the main body cover 10 closes the first housing chamber 20 for housing the rotary electric machine MG, the rotary electric machine MG can be easily touched from the outside of the case 1 when the main body cover 10 is not attached to the case 1. Therefore, the inverter-side bus bars 7 and the rotary electric machine-side bus bars 8 can be easily connected from the outside of the case 1. Further, since the third cover 31 closes the second housing chamber 30 for housing the inverter device INV, the inverter device INV can be easily touched from the outside of the case 1 when the third cover 31 is not attached to the case 1. Therefore, the inverter-side bus bars 7 and the inverter device INV can be easily connected from the outside of the case 1. That is, the inverter device INV and the rotary electric machine MG can be easily electrically connected, so that the productivity is improved.

For electrical connection between the inverter device INV and the rotary electric machine MG, there is a case in which a work opening called, for example, a service hole or a maintenance hole may be provided in the case 1. However, in the present embodiment, since the bus bars can be connected from both the main body cover 10 side and the third cover 31 side, it is not necessary to provide such an opening in the case 1. Therefore, the manufacturing cost of the case 1 can be reduced, and a decrease in the rigidity of the case 1 due to the opening can be suppressed.

As shown in FIGS. 1, 7, and the like, a fastening portion 9 for fastening the rotary electric machine-side bus bars 8 and the inverter-side bus bars 7 is disposed in the first housing chamber 20, and can fasten the rotary electric machine-side bus bars 8 and the inverter-side bus bars 7 in the first housing chamber 20. When the first housing chamber 20 is configured to include the opening through which a device such as the rotary electric machine MG can pass, and has a structure in which the opening is covered by the cover members (the first cover 10a and the second cover 10b) as in the present embodiment, the bus bars can be fastened in the first housing chamber 20 before the cover members are attached to the opening. That is, it is not necessary to separately provide an opening for fastening the bus bars to each other in the first housing chamber 20, for example, a service hole, and the structure of the case 1 can be simplified.

Further, as shown in FIGS. 2, 6 and 7, the second housing chamber 30 is disposed at a position where the arrangement area thereof in the up-down direction V overlaps the rotary electric machine MG. Therefore, while securing the arrangement area of the inverter device INV in the up-down direction V in the integrally formed case 1, an increase in size of the case 1 in the up-down direction V is suppressed. This facilitates reduction in size of the vehicle drive device 100.

Further, as shown in FIG. 7, the second housing chamber 30 is disposed at a position overlapping the differential gear mechanism DF when viewed from the axial direction. Therefore, the terminal block 50 can be disposed by efficiently utilizing the housing space in the case 1, and an increase in size of the vehicle drive device 100 can be suppressed.

Figure 9:
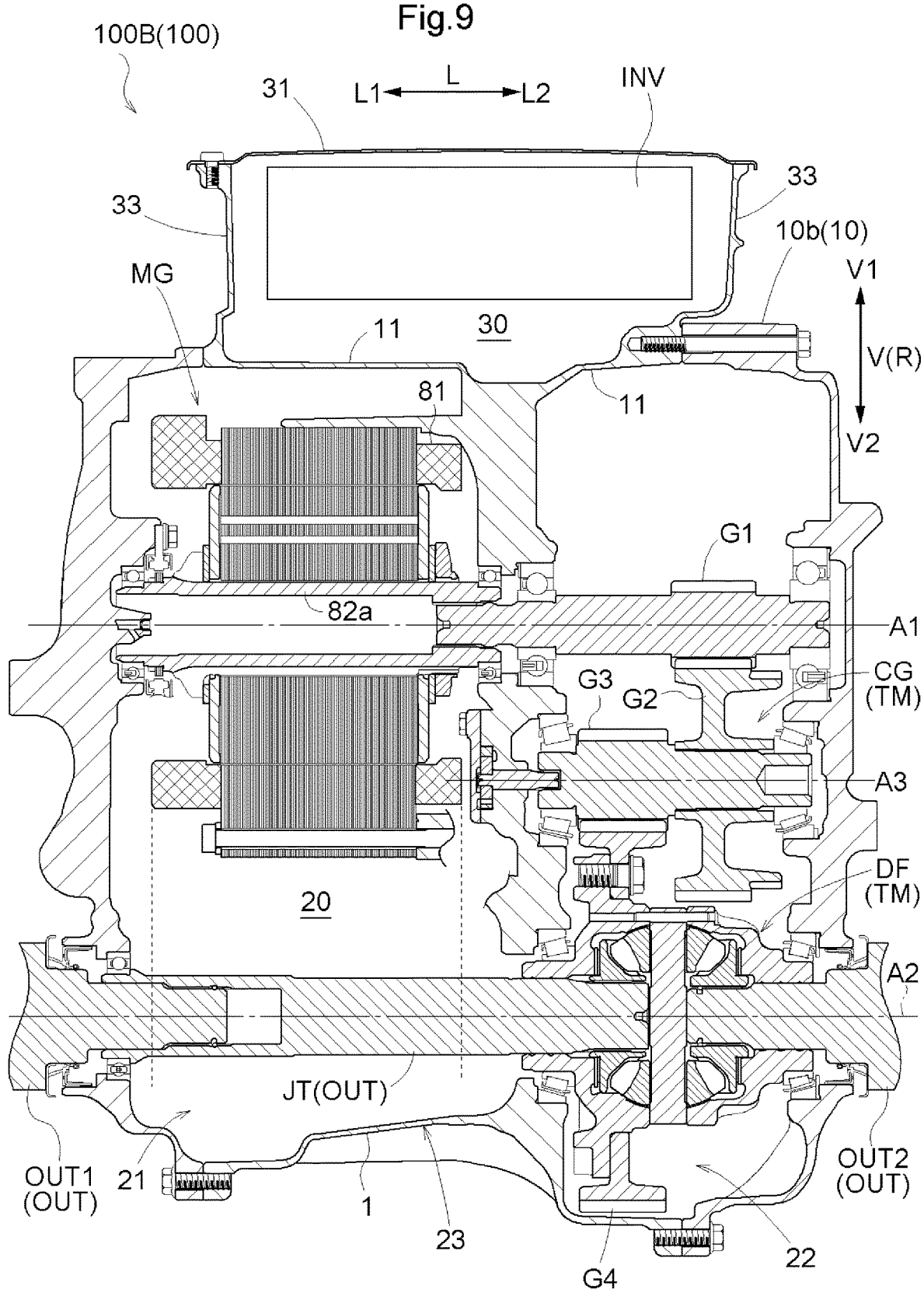
FIG. 9 is an axial sectional view of a vehicle drive device having another structure.
Figure 11:
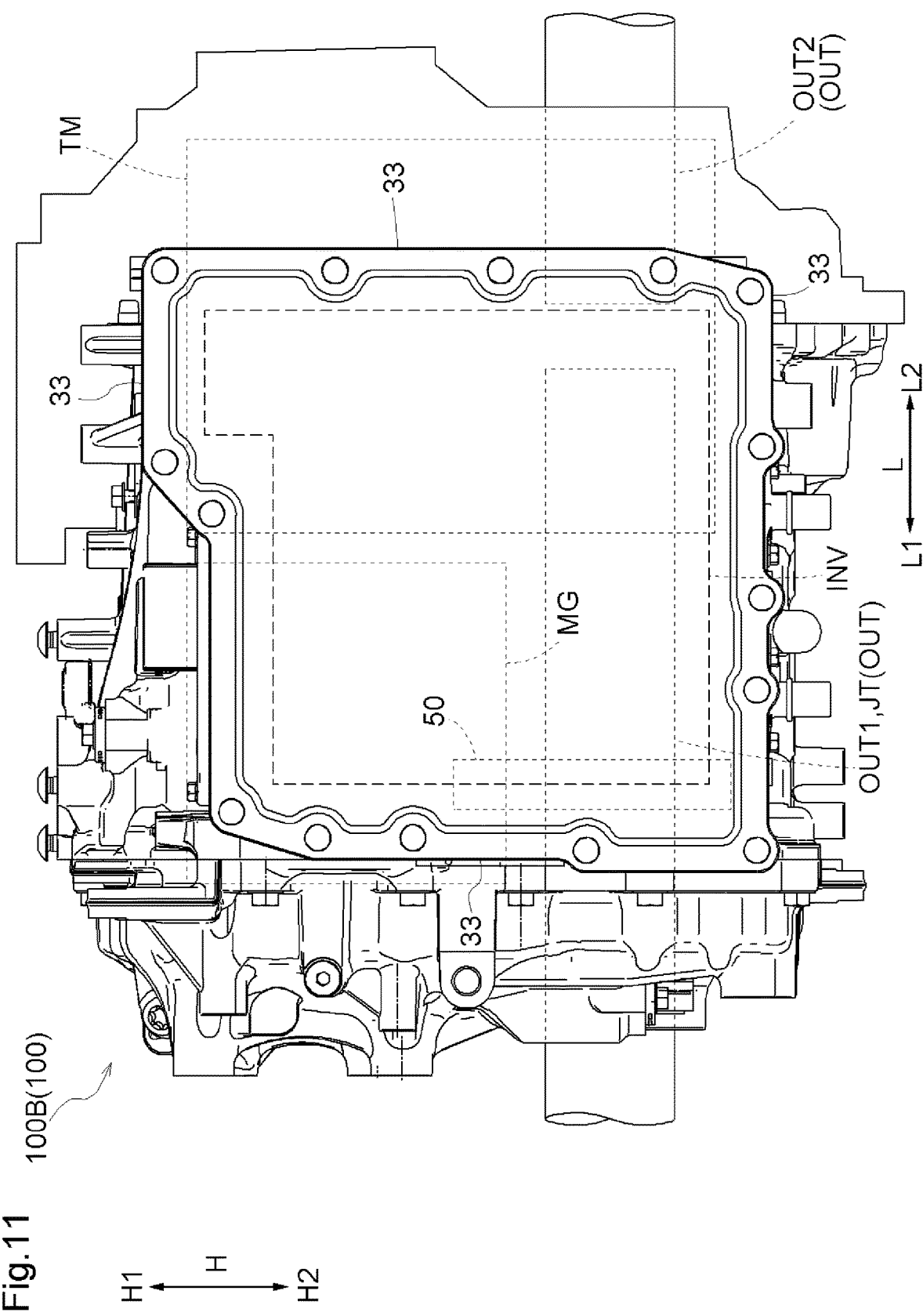
FIG. 11 is a plan view of the vehicle drive device having another structure from the first side in the up-down direction.
Figure 12:
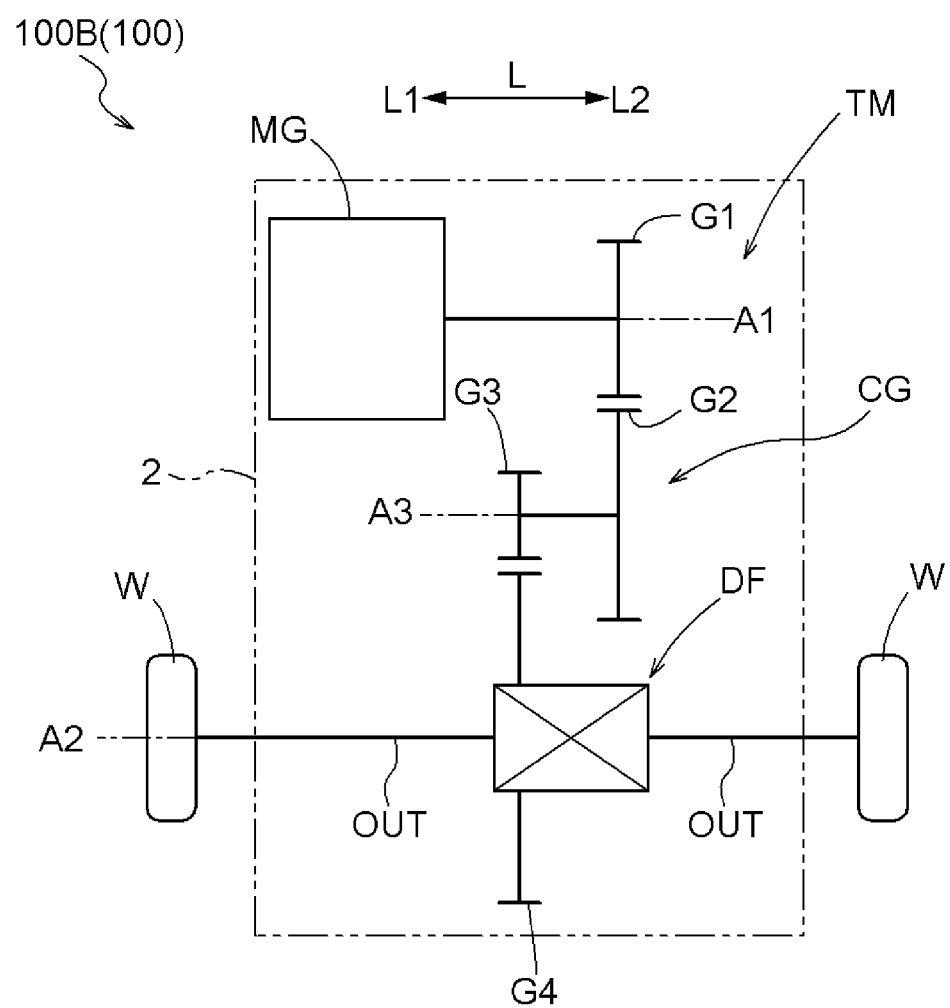
FIG. 12 is a skeleton diagram of the vehicle drive device having another structure.

As described above, a form corresponding to FIGS. 1 to 5 has been described by showing more specific structures as an example with reference to FIGS. 6 to 8. Hereinafter, the vehicle drive device 100 having a different structure will be described with reference to FIGS. 9 to 12. Hereinafter, the forms shown as an example in FIGS. 1 to 8 will be referred to as a first embodiment, and the forms shown as an example in FIGS. 9 to 12 will be referred to as a second embodiment, as appropriate. In the following description as well, the same portions as described above are indicated by the same reference numerals. FIG. 9 is an axial sectional view of the vehicle drive device 100 having a form different from the above, FIG. 10 is an axial orthogonal view of the vehicle drive device 100, FIG. 11 is a plan view of the vehicle drive device 100 from the first side V1 in the up-down direction, and FIG. 12 is a skeleton view of the vehicle drive device 100.

As in the first embodiment, the vehicle drive device 100 according to the second embodiment (referred to as a second vehicle drive device 100B as appropriate) also includes the rotary electric machine MG disposed on the first axis A1, the transmission mechanism TM to which the drive force from the rotary electric machine MG is transmitted, the differential gear mechanism DF that is disposed on the second axis A2 and that distributes the drive force from the rotary electric machine MG via the transmission mechanism TM to the wheels W, the output members OUT that are disposed on the second axis A2 and that drivingly connect the differential gear mechanism DF and the wheels W, the terminal block 50, and the case 1. The case 1 is integrally formed therein with the first housing chamber 20 for housing the rotary electric machine MG and the second housing chamber 30 for housing the inverter device INV. Also in the second vehicle drive device 100B, the integrally formed case 1 includes the partition wall 11 for separating the first housing chamber 20 and the second housing chamber 30. The terminal block 50 is disposed such that the arrangement area thereof in the axial direction L overlaps the rotary electric machine MG and disposed so as to penetrate the partition wall 11 in the radial direction R of the output member OUT.

In the second embodiment as well, as in the first embodiment, as compared with the case in which the two housing chambers are formed separately, the partition wall 11 for separating the first housing chamber 20 and the second housing chamber 30 can be commonized, so that the weight of the case 1 can be reduced. Further, in the second embodiment as well, since the rotary electric machine MG that is the driving force source of the wheels W and the output members OUT drivingly connected to the wheels W are housed in the first housing chamber 20, the first axis A1 and the second axis A2 can be easily disposed close to each other. Therefore, it is possible to reduce the size of the vehicle drive device 100. Further, in the second embodiment as well, since the rotary electric machine MG that is the driving force source of the wheels W and the output members OUT drivingly connected to the wheels W are housed in the first housing chamber 20, the first axis A1 and the second axis A2 can be easily disposed close to each other.

Figure 10:
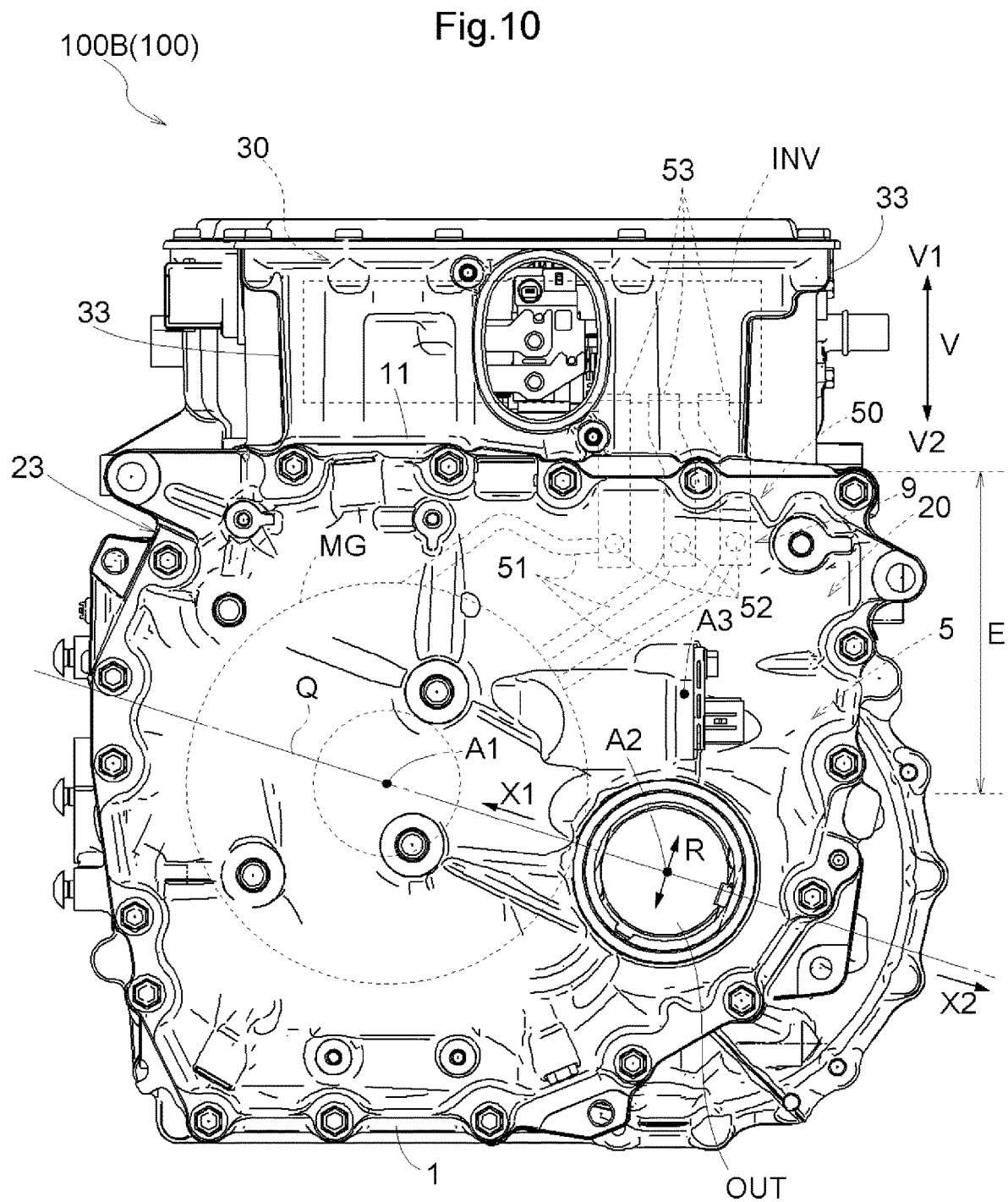
FIG. 10 is an axial orthogonal sectional view of the vehicle drive device having another structure.

In the second embodiment as well, as shown in FIG. 10, the terminal block 50 and the bus bars (the inverter-side bus bars 7 and the rotary electric machine-side bus bars 8) for connecting the rotary electric machine MG and the inverter device INV are disposed between the partition wall 11 and the output member OUT. Since the rotary electric machine MG and the output member OUT are housed in the first housing chamber 20 formed in the integrally formed case 1, an empty space can be easily secured in the first housing chamber 20. The terminal block 50 and the bus bars are disposed in such an empty space, so that an increase in size of the vehicle drive device 100 can be suppressed while securing a space for wiring. Further, the first housing chamber 20 for housing the rotary electric machine MG and the second housing chamber 30 for housing the inverter device INV are separated by the partition wall 11. In other words, the first housing chamber 20 and the second housing chamber 30 are adjacent to each other via one common partition wall 11. Further, since the inverter device INV and the output member OUT (second axis A2) overlap when viewed from the up-down direction, the rotary electric machine MG and the inverter device INV can be electrically connected via the bus bars in a short distance in an appropriate manner by disposing the terminal block 50 and the bus bars between the partition wall 11 and the output member OUT (second axis A2).

As shown in FIG. 10, the terminal block 50 and the partition wall 11 for separating the first housing chamber 20 and the second housing chamber 30 are disposed between the inverter device INV and the output member OUT (second axis A2). The output member OUT housed in the first housing chamber 20 and the inverter device INV housed in the second housing chamber 30 overlap each other when viewed from the up-down direction. Therefore, it is possible to suppress an increase in dimensions of the case 1 integrally formed therein with the first housing chamber 20 and the second housing chamber 30 in the up-down direction V. Further, the terminal block 50 can be disposed by effectively utilizing the target area E sandwiched between the second axis A2 and the inverter device INV. In the second embodiment as well, the output member OUT is disposed in the first housing chamber 20, and the partition wall 11 and the terminal block 50 can be disposed by effectively utilizing the target area E sandwiched between the output member OUT and the inverter device INV.

Further, as shown in FIGS. 10 and 11, the terminal block 50 is disposed at a position where the arrangement area thereof in the front-rear direction H that is a direction orthogonal to both the axial direction L and the up-down direction V overlaps the second axis A2. Therefore, the terminal block 50 can be disposed by efficiently utilizing the housing space in the case 1, and an increase in size of the vehicle drive device 100 can be suppressed.

The second vehicle drive device 100B also includes the main body cover 10 (the first cover 10*a* and the second cover 10*b*) that closes the first housing chamber 20, and the third cover 31 that closes the second housing chamber 30. The case 1 including the rotary electric machine MG, the transmission mechanism TM, and the inverter device INV is formed by the first cover 10*a* that closes the first opening 21 of the first housing portion 2 of the case 1 on the first axial side L1, the second cover 10*b* that closes the second opening 22 of the first housing portion 2 of the case 1 on the second axial side L2, and the third cover 31 that closes the second housing portion 3 of the case 1.

Since the main body cover 10 closes the first housing chamber 20 for housing the rotary electric machine MG, the rotary electric machine MG can be easily touched from the outside of the case 1 when the main body cover 10 is not attached to the case 1. Therefore, the inverter-side bus bars 7 and the rotary electric machine-side bus bars 8 can be easily connected from the outside of the case 1. Further, since the third cover 31 closes the second housing chamber 30 for housing the inverter device INV, the inverter device INV can be easily touched from the outside of the case 1 when the third cover 31 is not attached to the case 1. Therefore, the inverter-side bus bars 7 and the inverter device INV can be easily connected from the outside of the case 1. That is, the inverter device INV and the rotary electric machine MG can be easily electrically connected, so that the productivity is improved.

As described above, in the second embodiment as well, since the bus bars can be connected from both the main body cover 10 side and the third cover 31 side, it is not necessary to provide an opening called a service hole or a maintenance hole in the case 1. Therefore, the manufacturing cost of the case 1 can be reduced, and a decrease in the rigidity of the case 1 due to the opening can be suppressed.

As shown in FIG. 10, in the second embodiment as well, the fastening portion 9 for fastening the rotary electric machine-side bus bars 8 and the inverter-side bus bars 7 is disposed in the first housing chamber 20. Therefore, the rotary electric machine-side bus bars 8 and the inverter-side bus bars 7 can be fastened in the first housing chamber 20.

Further, as shown in FIG. 9, in the second embodiment as well, the second housing chamber 30 is disposed at a position where the arrangement area thereof in the axial direction L overlaps the differential gear mechanism DF. Therefore, the terminal block 50 can be disposed by efficiently utilizing the housing space in the case 1, and an increase in size of the vehicle drive device 100 can be suppressed.

Other Embodiments

Hereinafter, other embodiments will be described. It should be noted that the configurations of each embodiment described below are not limited to be applied independently, and can be applied in combination with the configurations of other embodiments as long as there is no contradiction.

(1) In the above embodiment, a form is shown as an example in which at least a part of the terminal block 50 and at least parts of the rotary electric machine-side bus bars 8 are disposed in the target area E sandwiched between the output member OUT and the inverter device INV. However, when the terminal block 50 is configured such that at least a part thereof disposed so as to penetrate the partition wall 11 in the radial direction R of the output member OUT is disposed in the target area E and configured to extend toward the rotary electric machine MG, all of the rotary electric machine-side bus bars 8 may not be disposed in the target area E.

(2) In the above embodiment, a form is shown as an example in which at least parts of the connection terminal portions 5 to which the rotary electric machine-side bus bars 8 are connected in the terminal block 50 are disposed on the second direction X2 side with respect to the second axis A2 in the direction along the reference plane Q. However, all of the connection terminal portions 5 may be disposed on the first direction X1 side with respect to the second axis A2 in the direction along the reference plane Q.

(3) In the above embodiments, a form is shown as an example in which the second rotary electric machine-side bus bar 8*b* and the third rotary electric machine-side bus bar 8*c* overlap each other when viewed from the axial direction L. That is, a form is shown as an example in which parts of the rotary electric machine-side bus bars 8 overlap when viewed from the axial direction L. However, when the area in the radial direction of the output member OUT, for example, the area between the output member OUT and the inverter device INV (for example, the target area E) can be sufficiently large, a form may be adopted in which all of the rotary electric machine-side bus bars 8 do not overlap when viewed from the axial direction L. Alternatively, when the area in the radial direction of the output member OUT, for example, the area between the output member OUT and the inverter device INV (for example, the target area E) is small, a form may be adopted in which all of the rotary electric machine-side bus bars 8 overlap when viewed from the axial direction L (including a form in which a part of each of the rotary electric machine-side bus bars 8 overlaps).

Summary of Embodiments

Hereinafter, the summary of the vehicle drive device (100) described above will be briefly described.

As one aspect, a vehicle drive device (100) includes: a rotary electric machine (MG) disposed on a first axis (A1); a transmission mechanism (TM) to which drive force from the rotary electric machine (MG) is transmitted; a differential gear mechanism (DF) that is disposed on a second axis (A2) that is a separate axis parallel to the first axis (A1) and that distributes the drive force from the rotary electric machine (MG) via the transmission mechanism (TM) to a wheel (W); an output member (OUT) that is disposed on the second axis (A2) and that drivingly connects the differential gear mechanism (DF) and the wheel (W); an inverter device (INV) for driving and controlling the rotary electric machine (MG); a terminal block (50) for electrically connecting a rotary electric machine-side bus bar (8) connected to a stator coil (81) of the rotary electric machine (MG) and an inverter-side bus bar (7) connected to the inverter device (INV); and a case (1) integrally formed in the case (1) with a first housing chamber (20) for housing the rotary electric machine (MG) and a second housing chamber (30) for housing the inverter device (INV), in which the integrally formed case (1) includes a partition wall (11) for separating the first housing chamber (20) and the second housing chamber (30), and the terminal block (50) is disposed such that an arrangement area of the terminal block (50) in an axial direction (L) that is a direction along the first axis (A1) overlaps the rotary electric machine (MG), and disposed so as to penetrate the partition wall (11) in a radial direction (R) of the output member (OUT).

According to this configuration, the inverter-side bus bar (7) and the rotary electric machine-side bus bar (8) are electrically connected via the terminal block (50) that penetrates in the radial direction the partition wall (11) for separating the second housing chamber (30) and the first housing chamber (20). A member for electrically connecting the inverter-side bus bar (7) and the rotary electric machine-side bus bar (8) is not provided so as to protrude in the axial direction, so that an increase in size of the case (1) in the axial direction (L) is suppressed, and an increase in size of the vehicle drive device (100) is suppressed. That is, according to this configuration, it is possible to provide the vehicle drive device (100) of which the size can be further reduced while appropriately performing electrical connection between the rotary electric machine (MG) and the inverter device (INV).

Further, in the vehicle drive device (100), it is preferable that the output member (OUT) be disposed in the first housing chamber (20).

According to this configuration, the vehicle drive device (100) can be appropriately configured by housing the output member (OUT) in the case (1).

Further, in the vehicle drive device (100), it is preferable that the partition wall (11) and the terminal block (50) be disposed between the inverter device (INV) and the second axis (A2) in an up-down direction (V).

According to this configuration, the partition wall (11) and the terminal block (50) can be disposed by effectively utilizing an area (E) sandwiched between the second axis (A2) and the inverter device (INV). As a result, the size of the vehicle drive device (100) can be reduced. For example, when the output member (OUT) is disposed in the first housing chamber (20), the partition wall (11) and the terminal block (50) can be disposed by effectively utilizing the area (E) sandwiched between the output member (OUT) and the inverter device (INV).

Further, in the vehicle drive device (100), it is preferable that an arrangement area of the terminal block (50) in a front-rear direction (H) that is a direction orthogonal to both the axial direction (L) and the up-down direction (V) be disposed at a position overlapping the second axis (A2).

According to this configuration, the terminal block (50) can be disposed by efficiently utilizing a housing space in the case (1), and an increase in size of the vehicle drive device (100) can be suppressed.

Further, in the vehicle drive device (100), it is preferable that at least a part of the terminal block (50) and at least a part of the rotary electric machine-side bus bar (8) be disposed in an area (E) sandwiched between the second axis (A2) and the inverter device (INV).

According to this configuration, the terminal block (50) and the rotary electric machine-side bus bar (8) can be disposed by effectively utilizing the area (E) sandwiched between the second axis (A2) and the inverter device (INV). As a result, the size of the vehicle drive device (100) can be reduced. For example, when the output member (OUT) is disposed in the first housing chamber (20), the terminal block (50) and the rotary electric machine-side bus bar (8) can be disposed by effectively utilizing the area (E) sandwiched between the output member (OUT) and the inverter device (INV).

Further, in the vehicle drive device (100), it is preferable that a fastening portion (9) for fastening the rotary electric machine-side bus bar (8) and the inverter-side bus bar (7) be disposed in the first housing chamber (20).

According to this configuration, the rotary electric machine-side bus bar (8) and the inverter-side bus bar (7) can be fastened in the first housing chamber (20). For example, when the first housing chamber (20) is configured to include an opening through which a device such as the rotary electric machine (MG) can pass, and has a structure in which the opening is covered by a cover member, the bus bars can be fastened in the first housing chamber (20) before the cover member is attached to the opening. That is, it is not necessary to separately provide an opening for fastening the bus bars to each other, in the first housing chamber (20), for example, a service hole, and a structure of the case (1) can be simplified.

Further, in the vehicle drive device (100), it is preferable that, in a direction along a plane (Q) including the first axis (A1) and the second axis (A2), at least a part of a connection terminal portion (5) to which the rotary electric machine-side bus bar (8) is connected in the terminal block (50) be disposed on a farther side (X2) from the rotary electric machine (MG) with respect to the second axis (A2).

According to this configuration, since the second axis (A2) and the rotary electric machine (MG) can be disposed close to each other, the size of the vehicle drive device (100) can be reduced in the radial direction (R).

Further, it is preferable that the vehicle drive device (100) include a plurality of the rotary electric machine-side bus bars (8 (8a, 8b, 8c)), and parts of the rotary electric machine-side bus bars (8 (8a, 8b, 8c)) overlap when viewed from the axial direction (L) along the axial direction.

According to this configuration, the parts of the rotary electric machine-side bus bars (8) overlap when viewed from the axial direction (L), so that a width of the rotary electric machine-side bus bars (8 (8a, 8b, 8c)) arranged along the radial direction can be reduced while securing an insulation distance between each of the rotary electric machine-side bus bars (8). That is, since a length between the output member (OUT) and the inverter device (INV) can be shortened, the size of the vehicle drive device (100) can be reduced.

Further, in the vehicle drive device (100), it is preferable that an arrangement area of the second housing chamber (30) in the up-down direction (V) be disposed at a position overlapping the rotary electric machine (MG).

According to this configuration, while securing an arrangement area of the inverter device (INV) in the up-down direction (V) in the integrally formed case (1), an increase in size of the case (1) in the up-down direction (V) is suppressed. This facilitates reduction in size of the vehicle drive device (100).

Further, in the vehicle drive device (100), it is preferable that the second housing chamber (30) be disposed at a position overlapping the differential gear mechanism (DF) when viewed from the axial direction along the axial direction (L).

According to this configuration, the terminal block (50) can be disposed by efficiently utilizing the housing space in the case (1), and an increase in size of the vehicle drive device (100) can be suppressed.

DESCRIPTION OF THE REFERENCE NUMERALS

1: case, 5: connection terminal portion, 7: inverter-side bus bar, 8: rotary electric machine-side bus bar, 9: fastening portion, 11: partition wall, 20: first housing chamber, 30: second housing chamber 50: terminal block, 51: first housing chamber-side connecting portion (connection terminal portion), 81: stator coil, 100: vehicle drive device, 100B: second vehicle drive device (vehicle drive device), A1: first axis, A2: second axis, DF: differential gear mechanism, INV: inverter device, L: axial direction, MG: rotary electric machine, OUT: output member, Q: reference plane (plane including axis of rotary electric machine and axis of output member), R: radial direction, TM: transmission mechanism, V: up-down direction, W: wheel, X2: second direction (farther side from rotary electric machine)

The invention claimed is:
1. A vehicle drive device comprising:
a rotary electric machine disposed on a first axis;
a transmission mechanism to which drive force from the rotary electric machine is transmitted;
a differential gear mechanism that is disposed on a second axis that is a separate axis parallel to the first axis and that distributes the drive force from the rotary electric machine via the transmission mechanism to a wheel;
an output member that is disposed on the second axis and that drivingly connects the differential gear mechanism and the wheel;
an inverter device for driving and controlling the rotary electric machine;
a terminal block for electrically connecting a rotary electric machine-side bus bar connected to a stator coil of the rotary electric machine and an inverter-side bus bar connected to the inverter device; and
a case integrally formed with a first housing chamber for housing the rotary electric machine and a second housing chamber for housing the inverter device, wherein
the integrally formed case includes a partition wall for separating the first housing chamber and the second housing chamber,
the terminal block is disposed such that an arrangement area of the terminal block in an axial direction that is a direction along the first axis overlaps the rotary electric machine, and disposed so as to penetrate the partition wall in a radial direction of the output member, and
the partition wall and the terminal block are disposed between the inverter device and the second axis in an up-down direction.
2. The vehicle drive device according to claim 1, wherein the output member is disposed in the first housing chamber.
3. The vehicle drive device according to claim 1, wherein an arrangement area of the terminal block in a front-rear direction that is a direction orthogonal to both the axial direction and the up-down direction is disposed at a position overlapping the second axis.
4. The vehicle drive device according to claim 1, wherein at least a part of the terminal block and at least a part of the rotary electric machine-side bus bar are disposed in an area sandwiched between the second axis and the inverter device.
5. The vehicle drive device according to claim 1, wherein a fastening portion for fastening the rotary electric machine-side bus bar and the inverter-side bus bar is disposed in the first housing chamber.
6. The vehicle drive device according to claim 1, wherein in a direction along a plane including the first axis and the second axis, at least a part of a connection terminal portion to which the rotary electric machine-side bus bar is connected in the terminal block is disposed on a farther side from the rotary electric machine with respect to the second axis.
7. The vehicle drive device according to claim 1, wherein the vehicle drive device includes a plurality of the rotary electric machine-side bus bars, and parts of the rotary electric machine-side bus bars overlap when viewed from the axial direction along the axial direction.
8. The vehicle drive device according to claim 1, wherein an arrangement area of the second housing chamber in the up-down direction is disposed at a position overlapping the rotary electric machine.
9. The vehicle drive device according to claim 1, wherein the second housing chamber is disposed at a position overlapping the differential gear mechanism when viewed from the axial direction along the axial direction.

* * * * *